(12) United States Patent
Kuhl

(10) Patent No.: US 9,988,266 B2
(45) Date of Patent: Jun. 5, 2018

(54) METHOD AND APPARATUS FOR PRODUCING $H_2$-RICH SYNTHESIS GAS

(71) Applicant: CCP Technology GmbH, München (DE)

(72) Inventor: Olaf Kuhl, Greifswald (DE)

(73) Assignee: CCP Technology GmbH (DE)

( * ) Notice: Subject to any disclaimer, the term of this patent is extended or adjusted under 35 U.S.C. 154(b) by 0 days. days.

(21) Appl. No.: 15/307,898

(22) PCT Filed: May 13, 2015

(86) PCT No.: PCT/EP2015/060687
§ 371 (c)(1),
(2) Date: Oct. 31, 2016

(87) PCT Pub. No.: WO2015/173352
PCT Pub. Date: Nov. 19, 2015

(65) Prior Publication Data
US 2017/0057818 A1   Mar. 2, 2017

(30) Foreign Application Priority Data

May 13, 2014 (DE) .................. 10 2014 007 001

(51) Int. Cl.
*C01B 3/24* (2006.01)
*C10G 2/00* (2006.01)
(Continued)

(52) U.S. Cl.
CPC .................. *C01B 3/24* (2013.01); *C01B 3/12* (2013.01); *C10G 2/30* (2013.01); *C10G 2/32* (2013.01);
(Continued)

(58) Field of Classification Search
CPC ..... C01B 3/12; C01B 3/24; C01B 2203/0272; C01B 2203/0283; C01B 2203/0288;
(Continued)

(56) References Cited

U.S. PATENT DOCUMENTS

| 6,533,945 | B2 | 3/2003 | Shah |
| 2003/0208959 | A1 | 11/2003 | Weimer et al. |
| 2014/0364516 | A1 | 12/2014 | Kuhl |

FOREIGN PATENT DOCUMENTS

CA         2842122 A1 *  6/2013  ............. C01B 31/18

* cited by examiner

*Primary Examiner* — Medhanit W Bahta
(74) *Attorney, Agent, or Firm* — Tarolli, Sundheim, Covell & Tummino LLP

(57) ABSTRACT

A method for producing ¾-rich synthesis gas comprises the following steps: decomposing a hydrocarbon-containing fluid into an $H_2$/C-aerosol in a first hydrocarbon converter by supplying energy which is at least partly provided in the form of heat; introducing at least a first stream of the $H_2$/C-aerosol into a first sub-process which comprises the following steps: directing at least a part of the $H_2$/C-aerosol from the first hydrocarbon converter into a first C-converter; introducing $CO_2$ into the first C-converter and mixing the $CO_2$ with the $H_2$/C-aerosol introduced into the first C-converter; converting the mixture of $H_2$/C-aerosol and $CO_2$ into a synthesis gas at a temperature of 800 to 1700° C.; mixing additional $H_2$ with the synthesis gas for the production of $H_2$-rich synthesis gas. In a second sub-process running in parallel with the first sub-process, hydrogen $H_2$ and carbon dioxide $CO_2$ are produced from a hydrocarbon-containing fluid, wherein at least a portion of the $CO_2$ produced in the second sub-process is introduced into the first C-converter; and wherein at least a portion of the $H_2$ produced in the second sub-process is mixed with the synthesis gas from the first C-converter. The $CO_2$ which is needed for the conver-
(Continued)

sion of C in the first C-converter can thereby be provided independently of an external source, and the entire operational sequence is easily controllable.

17 Claims, 3 Drawing Sheets

(51) Int. Cl.
*C10K 3/04* (2006.01)
*C01B 3/12* (2006.01)

(52) U.S. Cl.
CPC .............. *C10G 2/34* (2013.01); *C10K 3/04* (2013.01); *C01B 2203/0272* (2013.01); *C01B 2203/0283* (2013.01); *C01B 2203/0288* (2013.01); *C01B 2203/049* (2013.01); *C01B 2203/061* (2013.01); *C01B 2203/062* (2013.01); *C01B 2203/0805* (2013.01); *C01B 2203/0844* (2013.01); *C01B 2203/0861* (2013.01); *C01B 2203/0883* (2013.01); *C01B 2203/1276* (2013.01); *C01B 2203/141* (2013.01); *C01B 2203/145* (2013.01); *C10J 2300/1618* (2013.01); *C10J 2300/1853* (2013.01); *Y02P 20/129* (2015.11)

(58) Field of Classification Search
CPC ........ C01B 2203/049; C01B 2203/061; C01B 2203/062; C01B 2203/0805; C01B 2203/0844; C01B 2203/0861; C01B 2203/0883; C01B 2203/1276; C01B 2023/141; C01B 2203/145; C10G 2/30; C10G 2/32; C10G 2/34; C10K 3/04; C10J 2300/1618; C10J 2300/1853; Y02P 20/129
See application file for complete search history.

METHOD AND APPARATUS FOR PRODUCING $H_2$-RICH SYNTHESIS GAS

RELATED APPLICATION

This application corresponds to PCT/EP2015/060687, filed May 13, 2015, and German Appln. No. 10 2014 007 001.8, filed May 13, 2014, the subject matter of which is incorporated herein by reference in their entirety.

The present invention relates to a method and an apparatus for producing $H_2$-rich synthesis gas.

From WO/2013/091878, there is known a method for producing synthetic functionalised and/or non-functionalised hydrocarbons which comprises the decomposing of a hydrocarbon-containing fluid in a hydrocarbon converter into an $H_2$/C-aerosol consisting of carbon C and hydrogen $H_2$, directing at least a part of the aerosol from the hydrocarbon converter into a C-converter as well as introducing $CO_2$ from an external source, e.g. from an industrial process, into the C-converter. The $CO_2$ gas is mixed with the $H_2$/C-aerosol in the C-converter, wherein the $CO_2$ gas and the carbon are converted into carbon monoxide CO at a high temperature. The carbon monoxide and the hydrogen are converted into synthetic hydrocarbons in a CO-converter by means of a catalyst. This method has the disadvantage that an independent source for $CO_2$ gas must be available and furthermore, the production of the synthetic hydrocarbons depends on the feed-rate of the source for the $CO_2$ gas.

WO 02/051744 A1 discloses a method for producing synthesis gas, wherein a synthesis gas is produced in a first sub-process by means of partial oxidation. A second sub-process produces a $CO_2$-containing gas mixture and a $H_2$-containing gas mixture by means of steam reforming, a water gas shift converter and pressure swing adsorption, wherein these gas mixtures are directed to a synthesis unit and to a finishing unit. WO 2013/013895 A1 discloses a method for producing synthesis gas, wherein a plurality of sub-processes is used for producing synthesis gas, and wherein optionally $CO_2$ is directed from one sub-process to another sub-process.

Consequently, the object of the present invention is to provide a method and an apparatus for producing an $H_2$-rich synthesis gas in which an external source for the $CO_2$ gas is not necessary. This object is achieved by a method according to claim 1 and by an apparatus according to claim 9. The dependent claims relate to preferred embodiments.

Particularly, this object is achieved by a method for producing $H_2$-rich synthesis gas which comprises the following steps: decomposing a hydrocarbon-containing fluid into an $H_2$/C-aerosol in a first hydrocarbon converter by supplying energy which is at least partly provided in the form of heat; introducing at least a first stream of the $H_2$/C-aerosol into a first sub-process which comprises the following steps: directing at least a part of the $H_2$/C-aerosol from the first hydrocarbon converter into a first C-converter; introducing $CO_2$ into the first C-converter and mixing the $CO_2$ with the $H_2$/C-aerosol introduced into the first C-converter; converting the mixture of $H_2$/C-aerosol and $CO_2$ into a synthesis gas at a temperature of 800 to 1700° C.; mixing additional $H_2$ with the synthesis gas for producing $H_2$-rich synthesis gas. In a second sub-process running in parallel with the first sub-process, hydrogen $H_2$ and carbon dioxide $CO_2$ are produced from a hydrocarbon-containing fluid, wherein the $CO_2$ produced in the second sub-process is introduced into the first C-converter; and wherein only a portion of the $H_2$ produced in the second sub-process is mixed with the synthesis gas from the first C-converter. The $CO_2$ and a portion of the $H_2$ are produced from CO and $H_2O$ in the second sub-process by a water-gas-shift-reaction. The CO which is introduced into the water-gas-shift-reaction is produced in a second C-converter from carbon C and water $H_2O$ at a temperature of 800 to 1700° C. The $CO_2$ which is needed for the conversion of C in the first C-converter can thus be provided independently of an external source and the entire operational sequence is easily controllable.

In accordance with a preferred embodiment, the carbon which is converted in the second C-converter into CO is present in the form of C-particles of an $H_2$/C-aerosol. In one embodiment, the $H_2$/C-aerosol whose carbon is converted into CO in the second C-converter is a second stream of the $H_2$/C-aerosol produced in the first hydrocarbon converter. In this variant, only one hydrocarbon converter is needed, thus enabling cost savings to be made. Alternatively, the $H_2$/C-aerosol is produced by decomposing the hydrocarbon-containing fluid in a second hydrocarbon converter by supplying energy which is at least partly provided in the form of heat. In this variant of course, several hydrocarbon converters are needed but the operation of the individual converters can be controlled more precisely.

The process of supplying energy when decomposing the hydrocarbon-containing fluid in at least one of the first and second hydrocarbon converters is preferably effected primarily by a plasma. In particular, it is advantageous if the decomposing of the hydrocarbon-containing fluid takes place in the second sub-process at a temperature below 1000° C., and in particular, below 600° C. by means of a microwave plasma. The energy consumption of the method can thereby be reduced.

In accordance with the method, the ratio of CO to $H_2$ in the $H_2$-rich synthesis gas is preferably set to a value greater than 1:1 to 1:3, and in particular, to a value of approximately 1:2.1. It is thereby possible to economically implement a method for producing synthetic hydrocarbons in which an $H_2$-rich synthesis gas is produced by a method in accordance with any of the embodiments described above, and wherein the $H_2$-rich synthesis gas is then brought into contact with a catalyst and the temperature of the catalyst and/or the synthesis gas is controlled or regulated to be in a predetermined temperature range in order to produce synthetic hydrocarbons.

Depending on the method being used for producing synthetic hydrocarbons, water is produced as a by-product (also referred to as product water) and the water is usually mixed with a portion of the hydrocarbons. The water mixed with hydrocarbons can cause environmental pollution. In one embodiment of the method for producing synthetic hydrocarbons being described here, at least some of the water mixed with the portion of hydrocarbons is introduced into the second C-converter or into a combined hydrocarbon converter/C-converter. The (product) water can be preheated by means of a heat exchanger before it is introduced into the C-converter or the combined hydrocarbon converter/C-converter. The hydrocarbons that are introduced mixed with the water disintegrate at the operating temperature occurring in the second C-converter or in the combined hydrocarbon converter/C-converter. Consequently, a costly process for cleaning the water is not necessary.

Furthermore, the object is achieved by an apparatus for producing $H_2$-rich synthesis gas which comprises at least one first hydrocarbon converter for decomposing a hydrocarbon-containing fluid into an $H_2$/C-aerosol which comprises at least one process chamber having at least one hydrocarbon inlet for a hydrocarbon containing fluid and at least one first aerosol outlet for an $H_2$/C-aerosol and at least one unit for introducing energy into the process chamber, wherein the energy consists at least partly of heat. Furthermore, the apparatus comprises a first group of converters for implementing a first sub-process and a second group of converters for implementing a second sub-process. The first group of converters comprises the following: a first C-converter for the conversion of C and $CO_2$ into CO, wherein the first C-converter comprises at least one further process chamber having at least one $CO_2$ inlet for $CO_2$, at least one aerosol inlet for $H_2$/C-aerosol and at least one outlet, wherein the aerosol inlet of the first C-converter is connected directly to the at least one aerosol outlet of the first hydrocarbon converter; a first mixer which comprises a synthesis gas inlet that is connected to the outlet of the first C-converter and an $H_2$ inlet for additional $H_2$ and which is adapted for mixing the incoming synthesis gas and the additional $H_2$ to form an $H_2$-rich synthesis gas. The second group of converters comprises a second CO-converter which has at least one outlet for $CO_2$ and an outlet for $H_2$ and at least one inlet for at least synthesis gas, wherein the outlet for $CO_2$ is connected to the inlet for $CO_2$ of the first C-converter; and wherein the outlet for $H_2$ is connected to the $H_2$ inlet of the mixer. The second CO-converter is preferably suitable for implementing a water-gas-shift-reaction in which CO and $H_2O$ are converted into $CO_2$ and $H_2$. The second group of converters preferably comprises a second C-converter for the conversion of C and $H_2O$ into CO and $H_2$ wherein the second C-converter comprises at least one process chamber having at least one $H_2O$-inlet for $H_2O$, at least one aerosol inlet for an $H_2$/C-aerosol and at least one outlet for synthesis gas, and wherein the outlet for synthesis gas of the second C-converter is connected to the inlet for at least synthesis gas of the second CO-converter. The $CO_2$ which is needed for the conversion of C in the first C-converter can thus be made available by the second CO-converter independently of an external source.

In one embodiment of the second CO-converter, the inlet for at least synthesis gas is provided for introducing the $H_2O$ and the synthesis gas together into the second CO-converter. In another embodiment, the second CO-converter comprises a separate $H_2O$-inlet for introducing the $H_2O$ separately from the synthesis gas.

In one embodiment of the apparatus, the first hydrocarbon converter comprises at least one second aerosol outlet for an $H_2$/C-aerosol which is connected to the at least one aerosol inlet of the second C-converter. In this variant, only one hydrocarbon converter is needed, this thereby enabling cost savings to be made.

In another embodiment of the apparatus, the second group of converters comprises a second hydrocarbon converter for decomposing a hydrocarbon-containing fluid into an $H_2$/C-aerosol which comprises at least one process chamber having at least one inlet for a fluid containing hydrocarbon and at least one aerosol outlet for an $H_2$/C-aerosol and at least one unit for introducing energy consisting at least partly of heat into the process chamber; and wherein the aerosol outlet of the second hydrocarbon converter is connected to the at least one aerosol inlet of the second C-converter. In this variant, of course, several hydrocarbon converters are needed but the operation of the individual converters can be controlled more precisely.

Preferably, the first hydrocarbon converter is a high temperature plasma converter, and the second hydrocarbon converter is a low-temperature plasma converter or a thermally operated hydrocarbon converter which uses the waste heat from the first hydrocarbon converter for heating purposes. The energy consumption required by the method can thus be reduced.

In another embodiment of the apparatus, a filter which is suitable for the purposes of separating $H_2$ and C-particles is arranged at the inlet of the first C-converter and/or the second C-converter. Alternatively, a filter which is suitable for the purposes of separating $H_2$ and C-particles is integrated in the first C-converter and/or in the second C-converter. If the filter is present, the apparatus can also be operated with C-particles alone instead of with an $H_2$/C-aerosol.

An apparatus for producing synthetic hydrocarbons is described which comprises an apparatus in accordance with any of the embodiments described above and a first CO-converter. The first CO-converter comprises a process chamber in which a catalyst is arranged and furthermore comprises at least one inlet for synthesis gas which is connected to the outlet of the first C-converter, means for directing a synthesis gas into contact with the catalyst, and a control unit for controlling or regulating the temperature of the catalyst and/or the synthesis gas at a pre-determined temperature.

In an apparatus for producing synthetic hydrocarbons in which the first CO-converter is suitable for implementing a method for producing synthetic hydrocarbons in which water that is mixed with a portion of the hydrocarbons is produced as a by-product, at least some of the water from the first hydrocarbon converter mixed with the portion of the hydrocarbons is advantageously introduced into the second C-converter. A sophisticated process for cleaning the water is not then necessary. In this embodiment of the apparatus for producing synthetic hydrocarbons, the second C-converter can optionally be combined with the second hydrocarbon converter.

The invention is described in more detail hereinafter with reference to particular embodiments with the aid of the drawings.

It should be noted that in the following description, the expressions above, below, right and left as well as similar indications refer to the alignments or arrangements represented in the Figures and only serve for the description of the exemplary embodiments. These expressions are not however to be understood in a restrictive sense. Furthermore, the same reference symbols are used to a certain extent in the different Figures insofar as they refer to the same or similar parts. In the present application furthermore, processes and devices are described which involve "hot" materials or implement "hot" processes. In connection with this description, the expression "hot" is intended to describe a temperature of over 200° C. and preferably over 300° C. Insofar as synthetic hydrocarbons are mentioned in the present application, all synthetic functionalised and/or non-functionalised hydrocarbons are meant thereby.

Figure 1:
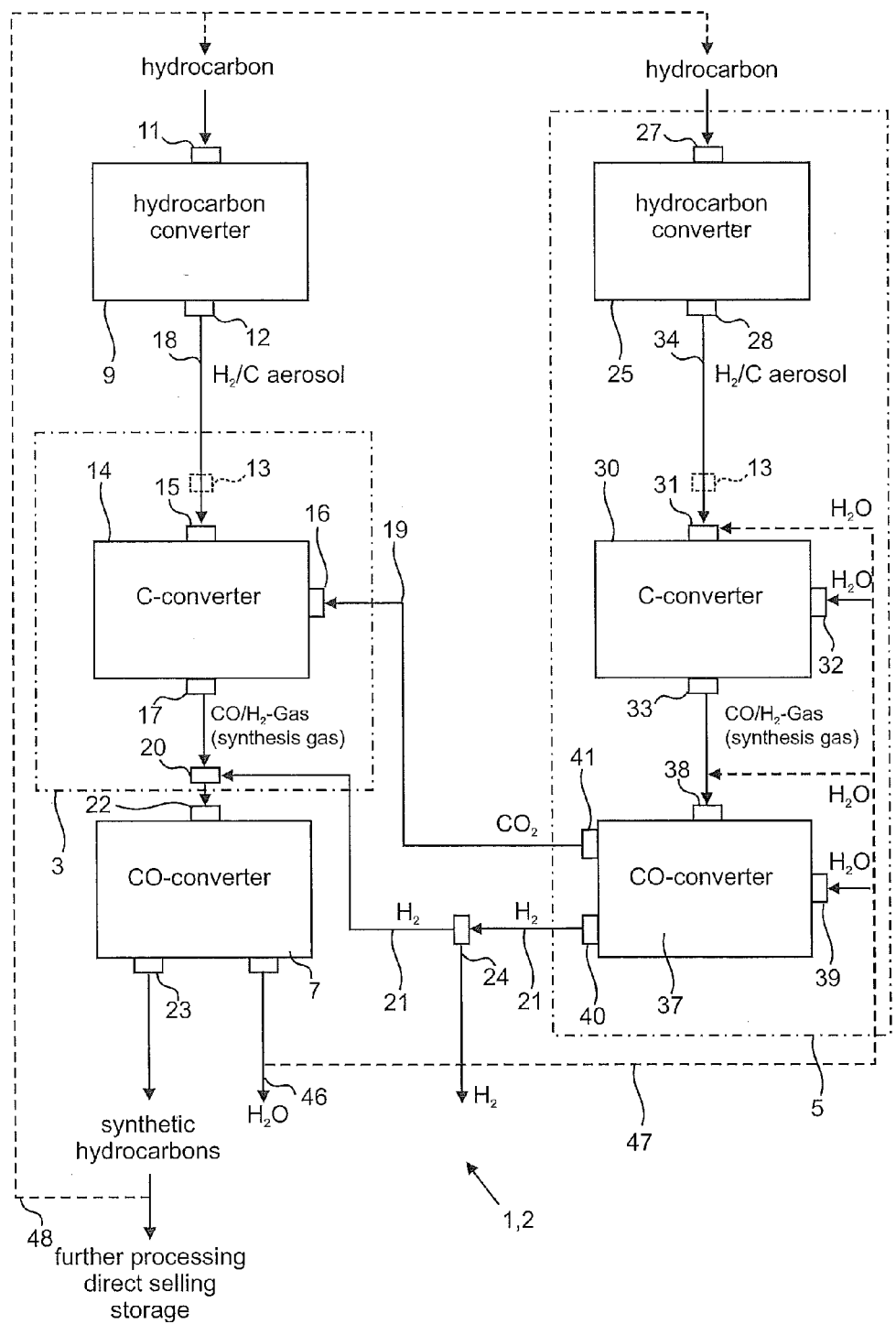
FIG. 1 shows a first embodiment of an apparatus for producing hydrocarbons which can implement a method in accordance with the present disclosure.

FIG. 1 schematically illustrates an apparatus 1 for producing a hydrogen-rich ($H_2$-rich) synthesis gas. The apparatus 1 comprises a first group of converters 3 and a second group of converters 5, and a first hydrocarbon converter 9.

The apparatus 1 together with a first CO-converter 7 forms an apparatus 2 for producing synthetic hydrocarbons which is described more precisely herein below. The fundamental operational sequence for the production of $H_2$-rich synthesis gas and the subsequent production of synthetic hydrocarbons from an $H_2$-rich synthesis gas in accordance with this description is also apparent from FIG. 1.

The first hydrocarbon converter 9 can convert a hydrocarbon-containing fluid into a $C/H_2$ aerosol and comprises a hydrocarbon inlet 11 as well as an aerosol outlet 12 for $C/H_2$ aerosol. In all of the embodiments, an optional filter 13 which is suitable for filtering out carbon-containing particles from a $C/H_2$ aerosol at the temperatures arising here can be arranged after the aerosol outlet 12 (e.g. at the inlet of a following C-converter). Such a filter is known from the German patent application No. 10 2013 013 443 for example. The optional filter 13 may be provided in only one or in both sub-processes. The optional filter 13 can also be in the form of an integral component of one of the C-converters. The exemplary embodiments for the case where no filter 13 is provided and thus a $C/H_2$ aerosol is directed into the first C-converter 14 are described In the following. However, the exemplary embodiments function in exactly the same manner when only C-particles which have been separated from the hydrogen by the filter 13 are passed on.

The first hydrocarbon converter 9 is any type of hydrocarbon converter which can convert or decompose the hydrocarbons that are being fed-in into carbon and hydrogen. The first hydrocarbon converter 9 can be operated thermally or operated with the help of a plasma. In a thermally operated hydrocarbon converter, a hydrocarbon-containing fluid introduced into a reaction area is heated-up by any type of heat source to a decomposition temperature. In a hydrocarbon converter operated by a plasma, the process of supplying energy is effected by means of a plasma arc. An introduced hydrocarbon-containing fluid disintegrates into carbon and hydrogen at the decomposition temperature. If possible, oxygen should be excluded from the process of decomposing the hydrocarbons in order to prevent the unwanted formation of carbon oxides or water. On the other hand, very small quantities of oxygen which are brought in with the hydrocarbons for example are not harmful to the process.

The first hydrocarbon converter 9 comprises a process chamber having an inlet for a hydrocarbon-containing fluid, at least one unit for introducing decomposition energy into the fluid and at least one outlet. The decomposition energy is provided at least partially by heat which is produced by a plasma (plasma reactor) for example. It could however be made available in some other way (thermal reactor). Primarily, the decomposition process is effected by heat. The fluid should be heated-up to over 1000° C. and in particular to a temperature over 1500° C. In the case of a plasma-operated hydrocarbon converter, any suitable gas which is supplied externally or is produced in the hydrocarbon converter can be selected for use as a plasma gas. For example, inert gases, e.g. argon or nitrogen are suitable for use as the plasma gas. On the other hand, hydrogen gas $H_2$ is useable as this results in any case during the decomposition of the hydrocarbons.

In the illustrated embodiment, a Kvaerner reactor which provides the necessary heat by means of a plasma arc in a plasma burner is employed as a hydrocarbon converter 9. However, other types of reactor which work at lower temperatures especially temperatures under 1000° C. and which, apart from the heat, introduce additional energy into the hydrocarbon such as by means of a microwave plasma for example are well-known. As will be explained hereinafter in more detail, the invention takes both types of reactor (as well as those that do not operate with a plasma) into consideration, and in particular too, these in combination with one another. Hydrocarbon converters working at a temperature of more than 1000° C. are referred to as high-temperature reactors hereinafter, whilst those converters working at temperatures below 1000° C. and in particular at a temperature between 200° C. and 1000° C. are referred to as low-temperature reactors.

Hydrogen and carbon are generated from hydrocarbons ($C_nH_m$) in the first hydrocarbon converter 9 by means of heat and/or a plasma. Hereby, the hydrocarbons are preferably introduced into the hydrocarbon converter 9 in gaseous form. In the case of hydrocarbons that are in liquid form under standard conditions, they can be turned into gaseous form before being introduced into the hydrocarbon converter, or they could also be introduced in a finely atomised form. Both forms are referred to as fluids hereinafter.

The process of decomposing the hydrocarbons should take place, if possible, in such a way that oxygen is excluded in order to prevent the unwanted formation of carbon oxides or water. Again however, small quantities of oxygen which are introduced with the hydrocarbons for example are not harmful for the process.

In the case of the above described Kvaerner reactor serving as a hydrocarbon converter 9, hydrocarbon-containing fluids are decomposed in a plasma burner at high temperature into pure carbon (in the form of activated carbon, carbon black, graphite or industrial soot for example) and hydrogen and possibly also impurities. The hydrocarbon-containing fluids serving as inlet materials for the hydrocarbon converter 9 are methane, natural gas, biogases, liquid gases or heavy oil for example, but may also be synthetic, functionalised and/or non-functionalised hydrocarbons that are used as inlet materials for the hydrocarbon converter 9. After the decomposing or decomposition process, the C-particles and the hydrogen are usually present in the form of a mixture and in particular, in the form of an $H_2$/C-aerosol.

The first group of converters 3 comprises a first C-converter 14 having an aerosol inlet 15, a $CO_2$ inlet 16 and a synthesis gas outlet 17. The first hydrocarbon converter 9 and the first C-converter 14 are arranged in such a manner that the aerosol outlet 12 of the first hydrocarbon converter 9 is connected to the aerosol inlet 15 of the first C-converter 14 by an aerosol connection 18, wherein the aerosol outlet 12 may also directly form the aerosol inlet 15 of the C-converter 14. Thus, carbon, which is a constituent of a $C/H_2$ aerosol (C-particles in an $H_2$ carrier gas), may be transported from the first hydrocarbon converter 9 directly into the first C-converter 14.

The first C-converter 14 may be any type of converter which can convert carbon (here, the C-particles of the aerosol) in the presence of carbon dioxide ($CO_2$) into carbon monoxide (CO). The $CO_2$ inlet 16 of the first C-converter 14 is connected to a $CO_2$ line 19 which is in turn connected to the second group of converters 5. In the embodiment of FIG. 1, the first C-converter 14 works in accord with a part of the blast furnace reaction known from the state of the art which runs at temperatures of between approx. 750° C. and 1200° C. without the necessity for a catalyst. Preferably, the first C-converter 14 works at a temperature of between 800° C. and 1000° C., wherein the heat required to reach this temperature is provided primarily by the $H_2$/C-aerosol of the first hydrocarbon converter 9, as will be described in more detail hereinafter. In the first C-converter 14, $CO_2$ is mixed with the hot H$_2$/C-aerosol and is thereby brought into contact with the carbon which is present in the form of solid constituents (C-particles) of the H$_2$/C-aerosol. The carbon is converted in accordance with the chemical equation CO$_2$+ C→2 CO. The C-converter 14 works best at the Boudouard equilibrium and a temperature of 1000° C. At temperatures of 800° C., about 94% carbon monoxide is produced, and at temperatures of around 1000° C. about 99% carbon monoxide is produced. Any further rise in temperature does not effect any substantial changes but nevertheless is not disadvantageous.

The first group of converters 3 comprises a mixer 20 which is connected to the synthesis gas outlet 17 of the first C-converter 14 and to an H$_2$ line 21 which is in turn connected to the second group of converters 5. Additional H$_2$ can be fed into the mixer 20 through the H$_2$ line 21 where it is mixed with the synthesis gas from the first C-converter 14 in order to produce an H$_2$-rich synthesis gas. The H$_2$-rich synthesis gas from the mixer 20 can be directed via a line into a synthesis gas inlet 22 of the first CO-converter 7, as depicted in FIG. 1. The mixer 20 may also consist simply of a tubular region where the H$_2$ line and the synthesis gas line join between the first C-converter 14 and the first CO-converter 7. With the help of the mixer 20 and in particular by means of a controlling/regulating process for the (additional) hydrogen introduced via the H$_2$ line 21 of the mixer 20, the process of mixing the synthesis gas at the synthesis gas outlet 17 may be affected in such a way that the particular composition that is necessary for the following conversion process in the first CO-converter 7 will be achieved. For many processes, e.g. the Fischer-Tropsch-Synthesis process, the ratio of hydrogen to CO should be as high as possible, i.e. an H$_2$-rich synthesis gas. Any desired ratio of hydrogen to CO at the synthesis gas outlet 17 can be set with the help of the mixer 20. Unneeded H$_2$ can be fed off via an optional second H$_2$ line 24 at a point between the second CO-converter 37 and the mixer 20 (or the first CO-converter 9 in the event that the mixer is integrated therein).

Figure 2:
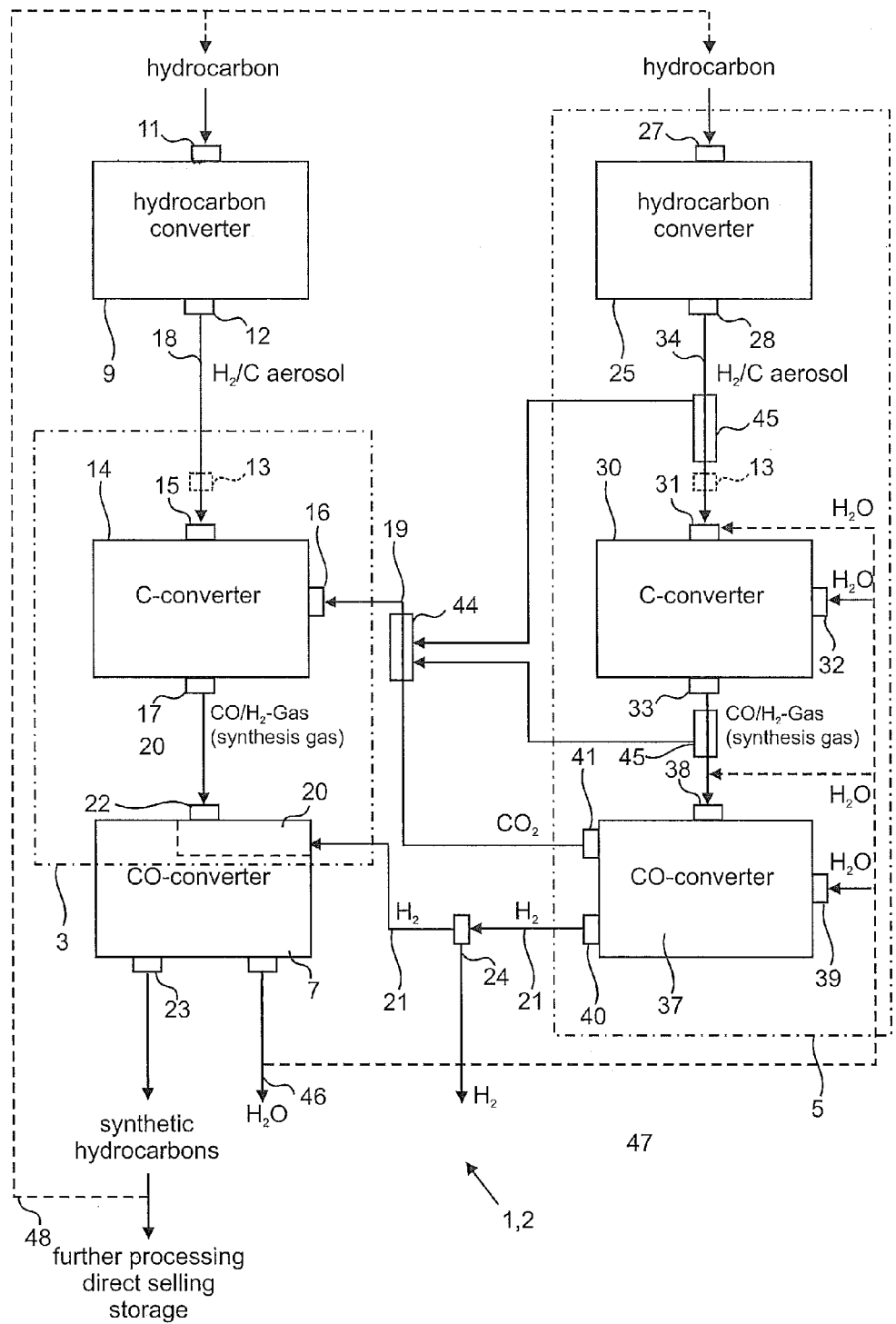
FIG. 2 shows a further embodiment of an apparatus for producing hydrocarbons which can implement a method in accordance with the present disclosure.

As an alternative, the mixer 20 is integrated into the first CO-converter 7 as shown in FIG. 2. In this case, the mixer 20 can be a separate mixing chamber in the first CO-converter 7 or simultaneously be a process chamber of the CO-converter 7. In this case, the second group of converters extends somewhat to a part of the first CO-converter 7. The synthesis gas from the first C-converter 14 is fed into the synthesis gas inlet 22 of the first CO-converter 7 and, after the introduction of additional H$_2$, is mixed therewith in order to produce an H$_2$-rich synthesis gas. Thus, in all of the embodiments, the hydrogen produced in the second subprocess can be mixed with the synthesis gas from the first C-converter 14 directly in the process chamber of the first CO-converter 7 or at a point between the first C-converter 14 and the first CO-converter 7.

The second group of converters 5 comprises a second hydrocarbon converter 25 which comprises a hydrocarbon inlet 27 as well as an aerosol outlet 28 for C/H$_2$ aerosol. The second group of converters 5 further comprises a second C-converter 30 having an aerosol inlet 31, an H$_2$O-inlet 32 and a synthesis gas outlet 33. The second hydrocarbon converter 25 and the second C-converter 30 are arranged in such a manner that the aerosol outlet 28 of the second hydrocarbon converter 25 is connected to the aerosol inlet 31 of the second C-converter 30 by an aerosol connection 34, wherein the aerosol outlet 28 could also directly form the aerosol inlet 31 of the second C-converter 30. Carbon as a constituent of a C/H$_2$ aerosol (C-particles in an H$_2$ carrier gas) can thus be transported from the second hydrocarbon converter 25 directly into the second C-converter 30. The H$_2$O-inlet 32 of the second C-converter 30 can be arranged separately from the aerosol inlet 31 or it can be provided for the purposes of introducing the H$_2$O and the aerosol together into the second C-converter 30. In the Figures, the optional possibility for the H$_2$O to be fed together with the aerosol from the second hydrocarbon converter 25 via the aerosol inlet 31 into the second C-converter 30 is shown by a broken arrow.

Alternatively, an optional filter 13 which is suitable for filtering carbon-containing particles out of a C/H$_2$ aerosol at the temperatures arising here can be arranged after the aerosol outlet 28 of the second hydrocarbon converter 25 in all embodiments. Such a filter and also a method for operating it are known from the German patent application No. 10 2013 013 443 for example. In the following, the exemplary embodiments are described for the case that no filter 13 is provided and consequently a C/H$_2$ aerosol is fed into the second C-converter 30. However, the exemplary embodiments function in exactly the same way if only C-particles that were separated by the filter 13 from the hydrogen are passed on.

Furthermore, the second group of converters 5 comprises a second CO-converter 37 which is suitable for implementing a water-gas-shift-reaction in which CO and H$_2$O are converted into CO$_2$ and H$_2$:

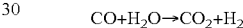

$$CO+H_2O \rightarrow CO_2+H_2$$

The second CO-converter 37 comprises an inlet 38 for synthesis gas which is connected to the synthesis gas outlet 33 of the second C-converter 30, wherein the synthesis gas outlet 33 could also directly form the inlet 38 of the second CO-converter 37. The second CO-converter 37 further comprises an H$_2$O-inlet 39 for supplying water or water vapour. The second CO-converter also comprises an H$_2$ outlet 40 and a CO$_2$ outlet 41 in order to feed off the CO$_2$ and H$_2$ which are produced in the water-gas-shift-reaction.

The CO$_2$ outlet 41 of the second CO-converter 37 is connected by the CO$_2$ line 19 to the first C-converter 14. Optionally, the CO$_2$ line 19 is heated by means of a heat exchanger 44 in order to preheat the CO$_2$ for the conversion process in the first C-converter 14 (see FIG. 2). The heat exchanger 44 is heated for example by waste heat which comes from an aerosol line between the second hydrocarbon converter 25 and the second C-converter 30 and is dissipated by means of another heat exchanger 45. The waste heat can also be dissipated from one or both hydrocarbon converters 9, 25 (not shown in the Figs.).

The H$_2$O-inlet 39 of the second CO-converter 37 can be arranged separately from the inlet 38 or it can be provided such as to introduce both H$_2$O and synthesis gas into the second CO-converter 37. In the Figures, the option for jointly feeding the H$_2$O and the synthesis gas from the second C-converter 30 into the second CO-converter 37 through the inlet 38 is shown by a broken arrow. It is likewise indicated by a broken line that the water to be introduced into the second C-converter 30 and into the second CO-converter 37 can optionally come from the first CO-converter.

The second C-converter 30 can be any suitable type of C-converter which can produce the synthesis gas (syngas) from carbon (C) and water (H$_2$O). In the second C-converter 30, H$_2$O is fed in over hot carbon or it could also be introduced in the form of water vapour in a hot aerosol stream of C-particles and hydrogen and mixed therewith. The carbon is thereby converted in accordance with the chemical equation $$C+H_2O \rightarrow CO+H_2,$$

The following reactions occur in the second C-converter 30:

$$C+H_2O \rightarrow CO+H_2+131.38 \text{ kJ/mol endothermic}$$

$$CO+H_2O \rightarrow CO_2+H_2-41.19 \text{ kJ/mol exothermic}$$

In the Boudouard equilibrium state, the following reaction takes place:

$$C+CO_2 \rightarrow 2CO+172.58 \text{ kJ/mol endothermic}$$

Since all three reactions are in equilibrium, the process in the second C-converter 30 preferably takes place at high temperatures of 800 to 1700° C., preferably 1000 to 1200° C., as the second reaction would be preferred at lower temperatures. The heat required for reaching this temperature is provided primarily by the material which is coming from the second hydrocarbon converter 25 as will be described in more detail hereinafter. Under these conditions, the water ($H_2O$) in the second C-converter 30 is in a vaporous state and can be introduced immediately in the form of steam. In operation of the apparatus 1, the addition of water is controlled in such a way that a surplus of water is avoided in order to prevent over-cooling. In the event of excessive cooling in the second C-converter 30, the second reaction above would likewise preferably occur.

The second C-converter 30 works best at high temperatures of 1000 to 1200° C. in order to repress the exothermic water-gas-shift-reaction $CO+H_2O \rightarrow CO_2+H$, and so optimise the proportion of carbon monoxide in the synthesis gas. The reactions in the second C-converter 30, which should take place if possible in the absence of oxygen, are known to the skilled person and will not therefore be described in greater detail here.

The second hydrocarbon converter 25 is constructed in similar manner to the first hydrocarbon converter 9, i.e. it is any type of hydrocarbon converter which can convert or decompose hydrocarbons that are being fed-in into carbon and hydrogen. The second hydrocarbon converter 25 comprises a process chamber having an inlet for a hydrocarbon containing fluid, at least one unit for supplying decomposition energy to the fluid and at least one outlet. The decomposition energy is provided at least partly by heat which is produced by a plasma for example. The second hydrocarbon converter 25 can be implemented in the same manner as the first hydrocarbon converter 9 in the form of a plasma converter or a differently operated thermal converter. The above description of the first hydrocarbon converter 9 also applies to the second hydrocarbon converter 25. Consequently, the second hydrocarbon converter 25 will not be described again in detail in order to avoid unnecessary repetitions.

Examples of combinations of the first and second hydrocarbon converters are:

a) the first hydrocarbon converter 9 is a high temperature plasma converter, and the second hydrocarbon converter 25 is a low-temperature plasma converter. In the case of a low-temperature plasma converter, one can optimise the quantity of expended energy. In the event that an additional heating system should be required in order to reach the conversion temperature for the second hydrocarbon converter, then this can be operated by means of waste heat from the first hydrocarbon converter 9.

b) the first hydrocarbon converter 9 is a high temperature plasma converter and the second hydrocarbon converter 25 is a thermally operated hydrocarbon converter which is operated with waste heat from the first hydrocarbon converter 9. If the second hydrocarbon converter 25 works thermally, it is possible to combine the second hydrocarbon converter 25 and the second C-converter 30 into a hydrocarbon/C-converter 25/30 having only one combined process chamber. In this case, two equivalent amounts of water are fed into the combined process chamber when in operation. Thereby a synthesis gas is produced which can be fed directly into the inlet 38 of the second CO-converter 37.

c) both hydrocarbon converters 9 and 25 are thermally operated hydrocarbon converters in which the decomposition energy and the decomposition temperature are produced by a heating system, i.e. other than by means of a plasma.

Figure 3:
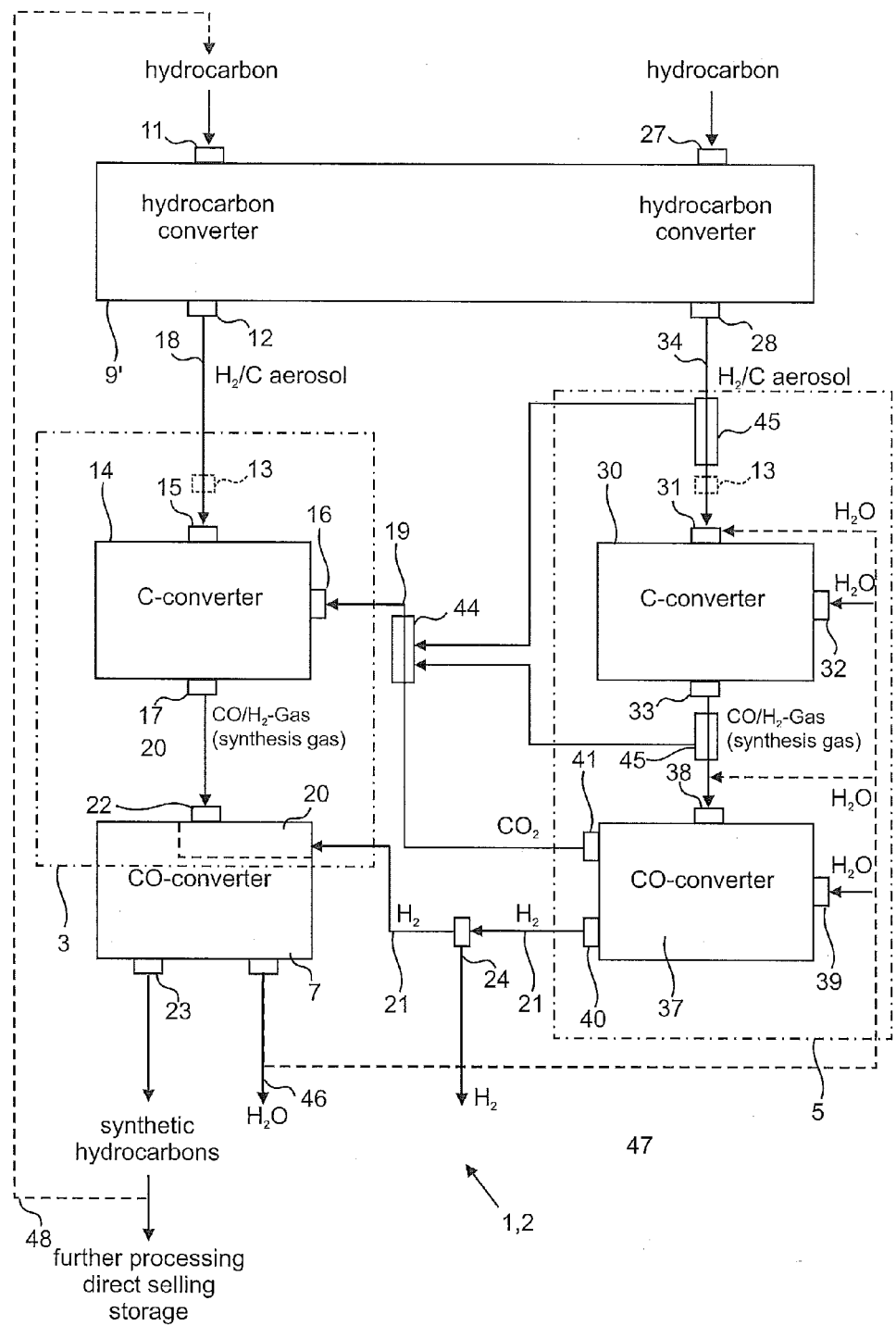
FIG. 3 shows yet another embodiment of an apparatus for producing hydrocarbons which can implement a method in accordance with the present disclosure.

Alternatively, the apparatus 1 can consist of just one hydrocarbon converter 9' which comprises a hydrocarbon inlet 11 as well as a first aerosol outlet 12 and a second aerosol outlet 28 (FIG. 3). The hydrocarbon converter 9' is used in place of the two hydrocarbon converters 9, 25 and produces $C/H_2$ aerosols for both groups of converters 3, 5. In this, case a first partial stream of the $C/H_2$ aerosol is fed to the first sub-process and a second stream of the $C/H_2$ aerosol is fed to the second sub-process. The construction and the mode of operation of the other converters and components are exactly the same as discussed with reference to FIGS. 1 and 2.

The apparatus 1 for producing $H_2$-rich synthesis gas (hydrocarbon converter 9, first group of converters 3 and second group of converters 5) together with the first CO-converter 7 form the above mentioned apparatus 2 for producing synthetic hydrocarbons (FIGS. 1 and 2). In the alternative of FIG. 3, the apparatus 2 comprises the hydrocarbon converter 9', the first group of converters 3, the second group of converters 5 and the first CO-converter 7. In FIG. 3, the second group of converters 5 does not comprise a separate hydrocarbon converter 25 since the $C/H_2$ aerosol for the second sub-process is produced by the hydrocarbon converter 9'.

The first CO-converter 7 is arranged downstream of the mixer 20 and comprises the synthesis gas inlet 22 which is connected to the mixer 20 of the first group of converters 3, and a hydrocarbon outlet 23 for expelling synthetic functionalised and/or non-functionalised hydrocarbons. The first CO-converter 7 can be any type of CO-converter for producing synthetic functionalised and/or non-functionalised hydrocarbons and it comprises a process chamber in which a catalyst is arranged, further means for directing a synthesis gas into contact with the catalyst, and a control unit for controlling or regulating the temperature of the catalyst and/or the synthesis gas at a pre-determined temperature. In the embodiment shown, the CO-converter is preferably a Fischer-Tropsch converter, a Bergius-Pier converter or a Pier converter with an appropriate catalyst and a temperature and/or pressure control unit.

In one embodiment, the first CO-converter 7 comprises a Fischer-Tropsch converter. A Fischer-Tropsch converter catalytically converts a synthesis gas into hydrocarbons and water. Various versions of Fischer-Tropsch reactors and Fischer-Tropsch processes are known to the skilled person so that they do not need to be discussed in detail here. The main reaction equations read as follows:

$$nCO+(2n+1)H_2 \rightarrow C_nH_{2n+2}+nH_2O \text{ for alkanes}$$

$$nCO+(2n)H_2 \rightarrow C_nH_{2n}+nH_2O \text{ for alkenes}$$

$$nCO+(2n)H_2 \rightarrow C_nH_{2n}+1OH+(n-1)H_2O \text{ for alcohols}$$

The Fischer-Tropsch processes can be carried out as high-temperature processes or as low-temperature processes wherein the process temperatures generally are between 200 and 400° C. Known variants of the Fischer Tropsch process are, inter alia, the high load synthesis process, the Synthol synthesis process and the Shell company's SMDS process (SMDS=Shell Middle Distillate Synthesis). Typically, a hydrocarbon compound consisting of liquid gases (propane, butane), gasoline, kerosene (diesel oil), soft paraffin, hard paraffin, methanol, methane, diesel fuel or a mixture of several of these products is produced by a Fischer-Tropsch converter. The Fischer-Tropsch-Synthesis process is exothermic as is known to the skilled person. The heat of reaction from the Fischer-Tropsch process can, for example, be used for pre-heating $CO_2$ by means of a heat exchanger (not shown in the Figures). For example, consideration is given to a two-stage preliminary heating of the $CO_2$ being introduced into the first C-converter 14, wherein pre-heating is firstly effected by means of the waste heat from the first CO-converter 7 (in the form of a Fischer-Tropsch converter in the embodiment) and afterwards further heating of the $CO_2$ is effected by means of heat from one or more of the hydrocarbon converters 9, 25.

Alternatively, the first CO-converter 7 comprises a Bergius-Pier converter or a combination of a Pier converter with an MtL converter (MtL=methanol-to-liquid). The Bergius-Pier process that is well-known to the skilled person occurs in a Bergius-Pier converter, whereby hydrocarbons are produced by hydrogenation of carbon with hydrogen in an exothermic chemical reaction. The spectrum of products emerging from the Bergius-Pier process depends on the reaction conditions and the manner in which the reaction is conducted. The end products are mainly liquid end products which can be used as fuels such as heavy and medium oils for example. Well-known developments of the Bergius-Pier process are the console process and the H-Coal process for example. In the combination of a Pier converter with an MtL converter, synthesis gas is firstly converted into methanol in accord with the known Pier process. The MtL converter is a converter in which methanol is converted into gasoline. A widespread method is the MtL method developed by the companies ExxonMobil and Esso. The input product for the MtL converter is typically methanol coming from the Pier converter for example. The output product produced by the MtL converter is typically gasoline which is suitable for the operation of a petrol engine.

In summary it can be said that functionalised and/or non-functionalised hydrocarbons can be produced synthetically from CO and $H_2$ in the first CO-converter 7 as end products irrespective of the particular one of the principles discussed above by which it works. The process heat which is produced in the course of the exothermic conversion process in the first CO-converter 7 can be used again by a heat exchanger for heating different areas of the apparatus 1 or for producing current in order to improve the efficiency of the apparatus described here.

Some variants which can be employed independently of one another in all of the embodiments are shown in the Figs.

a) The mixer 20 can be integrated into the first CO-converter 7 as was described in more detail above and as is shown in exemplary manner in FIG. 2. In this case, the first group of converters 3 also includes a portion of the first CO-converter 7 as indicated in FIG. 2.

b) In the event that $H_2O$ is produced during the production of synthetic hydrocarbons in the first CO-converter 7, the $H_2O$ is partly mixed with the hydrocarbons. This $H_2O$ mixed with hydrocarbons may be directed at least partially into the second C-converter 30 or into the combined hydrocarbon/C-converter 25/30 mentioned above (optional $H_2O$-line 47). If necessary, a portion of the $H_2O$ is separated from the hydrocarbons mixed therewith prior to being introduced into the converter.

c) If the output product of the first CO-converter 7 is a mixture of hydrocarbons which cannot be further processed directly or cannot be profitably sold as the finished product after they have been separated out and refined, then these hydrocarbons (such as methane or short-chain paraffins for example) may be fed back into the process described here. For this purpose, the apparatus 1 comprises an optional return pipe 48 with the aid of which a portion of the synthetically produced hydrocarbons can be fed back into one or both of the hydrocarbon inlets 11, 27 of the hydrocarbon converters 9, 25. Dependent on the composition of the synthetically produced hydrocarbons that are being fed back, further processing or separation of unsuitable hydrocarbons is effected before they are introduced into the hydrocarbon inlets 11, 27.

d) For all hydrocarbon converters 9, 25, 9', the optional return pipe 48 can feed into a common hydrocarbon inlet for returned hydrocarbons and a newly externally-introduced hydrocarbon-containing fluid or else can feed into a separate hydrocarbon inlet. An example of separate hydrocarbon inlets is shown in FIG. 3, where the externally-introduced hydrocarbon-containing fluid is fed into the hydrocarbon converter 9' via the hydrocarbon inlet 27 and the returned hydrocarbons are introduced via the hydrocarbon inlet 11.

The operation of the apparatus 1 for producing $H_2$-rich synthesis gas will now be described hereinafter in more detail with reference to FIG. 1. Firstly, a hydrocarbon-containing fluid (e.g. gas, an aerosol consisting of gas and solids or an aerosol consisting of gas and liquid droplets) is introduced into the first hydrocarbon converter 9 and there, it is decomposed to form a $H_2$/C-aerosol. The $H_2$/C-aerosol from the first hydrocarbon converter 9 is introduced into the first group of converters 3 in which a first sub-process takes place.

In the following, it is assumed that the first hydrocarbon converter 9 is a high-temperature reactor of the Kvaerner type. Hydrocarbon-containing fluids (particularly in gaseous form) are introduced via the hydrocarbon inlet 11 into the first hydrocarbon converter 9. If the hydrocarbon is methane ($CH_4$) for example, then 1 mol carbon and 2 mol hydrogen are produced from 1 mol methane. In the case of other hydrocarbons, correspondingly different molar ratios of carbon and hydrogen result. The hydrocarbons are converted in the first hydrocarbon converter 9 at about 1600° C. in accordance with the following reaction equation, wherein the supplied energy is heat which is produced in the plasma by means of electrical energy:

$$C_nH_m + \text{energy} \rightarrow nC + m/2H_2.$$

By appropriate processing, the first hydrocarbon converter 9 (Kvaerner reactor) is able, when in continuous operation, to achieve almost complete conversion of the hydrocarbon into its constituents i.e. hydrogen and carbon (more than 94% in dependence on the temperature, see above). The hydrogen and carbon are present as a mixture, i.e. in the form of an $H_2$/C-aerosol.

The $H_2$/C-aerosol is fed out of the first hydrocarbon converter 9 and supplied to the first C-converter 14. The hydrogen serves as a carrier gas for the carbon (C-particles) and does not impair the conversion process occurring in the first hydrocarbon converter 14 although the hydrogen may serve as an additional heat source. The $H_2$/C-aerosol is fed directly from the aerosol outlet 12 into the aerosol inlet 15 of the first C-converter 14. Herein, the expression "directly" feeding from the aerosol outlet 12 to the aerosol inlet 15 is intended to cover all such variants wherein the materials being fed-in do not cool off by more than 50% relative to their original temperature (preferably by no more than 20%). Since the $H_2$/C-aerosol emerging from the first hydrocarbon converter 9 has a high temperature (preferably over 1000° C.), the heat energy contained therein can be used for maintaining the temperature necessary for the conversion process in the first hydrocarbon converter 14 which preferably works at a temperature of approx. 1000° C.

The aerosol connection 18 between the first hydrocarbon converter 9 and the first C-converter 14 is formed in such a manner that the carbon on its way from the first hydrocarbon converter 9 to the first C-converter 14 does not cool down excessively (by less than 50%, and preferably less than 20% with regard to the temperature). For example, the aerosol connection 18 can, in particular, be insulated and/or even actively heated, whereby—apart from the supply of heat to the first hydrocarbon converter 9—it is preferred that no further heat be supplied to the system. The hydrogen produced in the first hydrocarbon converter 9 likewise contains heat energy due to the operating temperature in the first hydrocarbon converter 9.

In the first C-converter 14, the $CO_2$ which is introduced via the $CO_2$ inlet 16 is mixed with the $H_2$/C-aerosol and thereby brought into contact with the hot carbon. The first C-converter 14 works best at the Boudouard equilibrium which is established during the process of converting carbon dioxide by utilising hot carbon. The reaction, which is known to the skilled person, is dependent on the pressure and the temperature but will not be described in detail here. Either the quantity of $CO_2$ being introduced into the first C-converter 14 or the quantity of carbon (i.e. the amount of the $H_2$/C-aerosol) can be controlled and/or regulated by suitable means.

$$CO_2 + C \rightarrow 2CO \quad \Delta H = +172.45 \text{ kJ/mol}$$

The $CO_2$ originates from a second sub-process which is implemented in the second group of converters 5 and produces suitable quantities of $CO_2$. In dependence on the temperature of the $CO_2$ emerging from the second sub-process, it is advantageous to preheat the $CO_2$ which is being introduced into the $CO_2$ inlet 16 of the first C-converter 14 since the first C-converter 14 works at a temperature of between 800 and 1200° C. Preheating of the $CO_2$ can, for example, be achieved by preheating the $CO_2$ line 19 by means of the optional heat exchangers 44, 45 (FIG. 2). It is preferred, however, that just the heat contained in the $H_2$/C-aerosol will suffice for bringing the $CO_2$ up to the desired temperature. It is thereby possible to convert the hot carbon (C-particles) from the first hydrocarbon converter 9 into CO using warm to hot $CO_2$ in the first C-converter 14 without energy having to be supplied from an external source or at least only to a nominal extent. It is preferred that at least 80% and in particular at least 90% of the heat required for reaching the conversion temperature should originate from the first hydrocarbon converter 9. It is only in the event that the heat produced in the first hydrocarbon converter 9 is not sufficient for attaining the desired conversion temperature of approximately 1000° C. that an optional additional heating unit could be provided for warming up the first C-converter 14 or the elements contained therein.

An additional heating unit could also be used just during the starting phase of the apparatus 1 in order to bring one or more of the converters 9, 14, 25, 30, 37 or medium-conveying parts of the apparatus 1 up to an initial temperature so that the system will reach a desired temperature level more quickly. The process of heating all the medium-conveying parts purely by the heat produced in the hydrocarbon converters 9, 25 could last for too long a time in the starting phase.

Hot synthesis gas at a temperature of approximately 800 to 1000° C. (in dependence on the operating temperature of the first C-converter 14) emerges from the synthesis gas outlet 17 of the first C-converter 14. The synthesis gas consists of carbon monoxide (CO, which is produced according to the conversion equation mentioned above) mixed with the hydrogen which was introduced in the form of a gaseous component of the $H_2$/C-aerosol into the first C-converter 14. The synthesis gas emerging from the first C-converter 14 thus likewise contains heat energy which can, for example, be used directly or indirectly by a heat exchanger that is not shown in the Fig. for preheating the $CO_2$ introduced into the $CO_2$ inlet 16.

The synthesis gas from the synthesis gas outlet 17 has a ratio of CO to $H_2$ which depends on the cracked hydrocarbons. In the event that $CH_4$ is decomposed in the hydrocarbon converter 9, a synthesis gas having a ratio of 1:1 of $H_2$ to CO is produced at the synthesis gas outlet 17 of the first C-converter 14. For many processes, the ratio of $H_2$ to CO should be as high as possible, i.e. an $H_2$-rich synthesis gas. Particularly for the above-described production of synthetic hydrocarbons, the ratio of CO to $H_2$ in the $H_2$-rich synthesis gas is set to a value of greater than 1:1 to 1:3, and in particular to a value of approximately 1:2.1. The mixing of the $H_2$-rich synthesis gas can be affected with the help of the mixer 20 and in particular by controlling/regulating the (additional) hydrogen being introduced via the $H_2$ line 21 into the mixer 20 in such a way that the composition necessary for the subsequent conversion process in the first CO-converter 7 is achieved.

The carbon dioxide which is directed into the first C-converter 14 via the $CO_2$ line 19 and the hydrogen which is directed into the mixer 20 via the $H_2$ line 21 are produced in the second CO-converter 37 by means of the water-gas-shift-reaction in which the CO and $H_2O$ are converted into $CO_2$ and $H_2$:

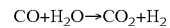
$$CO + H_2O \rightarrow CO_2 + H_2$$

In this case, the CO is present as a constituent of a synthesis gas which is produced in the second C-converter 30. The CO portion of this synthesis gas participates in the water-gas-shift-reaction whilst the $H_2$ portion of the synthesis gas does not participate. The water-gas-shift-reaction is known to the skilled person and takes place at a temperature of approx. 250-300° C. in the second CO-converter 37.

The gases $CO_2$ and $H_2$ which were produced in the second CO-converter 37 are separated by a separating device not shown in the Figs. Various types of separating device for $CO_2$ and $H_2$ are known to the skilled person and, for example, use could be made of a PSA apparatus (PSA: Pressure Swing Adsorption) the construction and functioning of which are known to the skilled person. The separating device for $CO_2$ and $H_2$ may be integrated into the second CO-converter 37. Alternatively, the separating device could be a separate component into which a gas mixture consisting of $CO_2$ and $H_2$ is introduced and from which $CO_2$ and $H_2$ are discharged separately over the lines 19 and 21.

The second C-converter 30 produces the synthesis gas for the second CO-converter 37 from carbon and water at a temperature of approx. 800-1700° C. The following conversion reaction, which is known to the skilled person, is dependent on pressure and temperature and will not be described in detail here.

$$C+H_2O \rightarrow CO+H_2 \Delta H=+131.38 \text{ kJ/mol}$$

The carbon is present solely in the form of C-particles (if an optional filter 13 is provided) or it is in the form of solid constituents of an $H_2$/C-aerosol (no filter 13) and is introduced via the aerosol inlet 31. Water, particularly in the form of steam, is introduced through the $H_2O$-inlet 32 of the second C-converter 30 and fed over hot carbon and/or mixed therewith. Either the quantity of water introduced into the hydrocarbon converter 9 or the quantity of carbon can be controlled and/or regulated by suitable means. The second C-converter 30 works best at high temperatures since an endothermic reaction is involved ($\Delta H=+131.38$ kJ/mol) and the water-gas-shift-reaction which is competing therewith is an exothermic reaction.

However, the Boudouard equilibrium is also the limiting factor for the conversion reaction in the second C-converter 30 for which reason, at temperatures above 1000° C. and in the absence of an excess of water, there is almost exclusively a mixture of carbon monoxide and hydrogen present.

It is advantageous to preheat the water being introduced into the $H_2O$-inlet 32 of the second C-converter 30 since the second C-converter 30 preferably works at a temperature>1000° C. Preliminary heating of the water for the second C-converter 30 can, for example, be achieved by using the waste heat from the first CO-converter 7 (if present) or the waste heat from the hydrocarbon converters 9, 25 (or 9') directly or indirectly by means of a heat exchanger arrangement for preheating the water. It is preferred however that the heat contained in the carbon or the $H_2$/C-aerosol should suffice for bringing the water up to the desired temperature. It is only in the event that the heat produced in the hydrocarbon converter 3 should not be sufficient for achieving the desired conversion temperature of approximately 1000° C. that an optional additional heating unit need be provided for heating up the second C-converter 30 or the elements in it. A preheating unit could also be used just during the starting phase of the apparatus in order to initially bring the second C-converter 30 or other medium-conveying parts up the starting temperature in order to allow the system to reach a desired temperature level more rapidly.

Hot synthesis gas ($CO+H_2$) at a temperature>1000° C. (dependent on the operating temperature of the second C-converter 30) emerges from the second C-converter 30. The synthesis gas emerging from the second C-converter 30 thus likewise contains heat energy which can be used directly or indirectly by means of a heat exchanger (not shown) for example for preheating the water being introduced into the $H_2O$-inlet 32 or the $CO_2$ entering the $CO_2$ line 19. By appropriate choice of the operating parameters in the second C-converter 30, i.e. a temperature between 1000 and 1200° C., (and separating hydrogen and carbon before the second C-converter 30 by means of the optional filter 13), a synthesis gas is produced in which CO and $H_2$ are present in a ratio of 1:1, which is referred to as water gas. Without separating hydrogen and carbon prior to entry into the second C-converter 30 and appropriately adjusting the operating parameters in the second C-converter 30, i.e. a temperature between 1000 and 1200° C., a synthesis gas is produced in which CO and $H_2$ are present in a ratio of approximately 1:3. The $H_2$ portion of the synthesis gas does not participate in the water-gas-shift-reaction in the second CO-converter 37.

When emerging from the second C-converter 30, the synthesis gas has a much higher temperature (>1000° C.) than the working temperature (250-300° C.) of the second CO-converter 37. The hot synthesis gas can be cooled down to a lower temperature by mixing liquid water or comparatively cold water vapour (100-150° C.) with the hot synthesis gas for the water-gas-shift-reaction before being introduced into the second CO-converter 37. The $H_2O$ together with the synthesis gas then enters the second CO-converter 37 through the synthesis gas inlet 38.

The carbon which is converted into CO in the second C-converter 30 is present in the form of solid constituents of an $H_2$/C-aerosol from the second hydrocarbon converter 25. In the case where the optional filter 13 is provided between the second hydrocarbon converter 25 and the second C-converter 30, the carbon is solely in the form of hot C-particles. In operation, the second hydrocarbon converter 25 functions in a similar way to the first hydrocarbon converter 9 described above. The hydrocarbons are converted in the second hydrocarbon converter 25 at a decomposition temperature in accordance with the following reaction equation, wherein the supplied energy is heat which is produced in a plasma by means of electrical energy:

$$C_nH_m + \text{energy} \rightarrow nC + m/2H_2.$$

If the second hydrocarbon converter 25 is a high-temperature reactor, the operating temperature is approx. 1600° C. It is preferred that the second hydrocarbon converter 25 be a low-temperature reactor in which the decomposition of the hydrocarbons is effected by means of a microwave plasma at a temperature below 1000° C. and in particular, below 600° C. The decomposition temperature can also be achieved at least partly by thermally heating the process chamber of the second hydrocarbon converter 25. Such thermal heating of the process chamber is effected by using waste heat from the first hydrocarbon converter 9 for example.

In the following, it is assumed that separation of the $H_2$/C-aerosol does not take place and that the carbon and the hydrogen are fed out of the second hydrocarbon converter 25 into the second C-converter 30 in the form of a mixture. The hydrogen does not impair the conversion process in the second C-converter 30, although it can serve as an additional heat carrier because it likewise contains heat energy due to the operating temperature occurring during the decomposition process. The carbon is introduced directly via the aerosol outlet 28 into the second C-converter 30. Herein, the expression introduced "directly" from the aerosol outlet 28 into the second C-converter 30 is intended to cover all such variants wherein the materials being introduced do not cool off by more than 50% relative to their original temperature (preferably by no more than 20%). Since the carbon emerging from the second hydrocarbon converter 25 has a high temperature (preferably over 1000° C.), the heat energy contained therein can be used for maintaining the temperature necessary for the conversion process in the second hydrocarbon converter 30 which works at a temperature of approx. 1000-1200° C.

The connection between the second hydrocarbon converter 25 and the second C-converter 30 is formed in such a manner that the carbon on its way to the second C-converter 30 does not cool down excessively (by less than 50%, and preferably less than 20% with regard to the temperature). For example, the connection can be insulated and/or even actively heated, wherein—apart from the supply of heat to the second hydrocarbon converter 25—preferably no further heat is supplied to the system.

After an $H_2$-rich synthesis gas has been produced by the operating steps described above, synthetic hydrocarbons are produced in the first CO-converter 7. The $H_2$-rich synthesis gas is brought into contact with a catalyst in the first CO-converter 7, and the temperature of the catalyst and/or the temperature of the synthesis gas is controlled or regulated within a pre-determined temperature range in order to produce synthetic hydrocarbons. The chemical reactions mentioned above occur depending on the implementation of the first CO-converter 7, whereby synthetic functionalised and/or non-functionalised hydrocarbons and water are produced.

The resultant synthetic hydrocarbons may be utilised as saleable products or may be subjected to further processing. In the event that a portion of the synthetic hydrocarbons is not suitable for sale or further processing then this part may be fed back into one or more of the hydrocarbon converters 9, 25, 9'.

In theory, the resultant water which is also referred to as product water can simply be led off via the $H_2O$-line 46. Nevertheless, in some of the currently employed methods for the production of synthetic hydrocarbons, the resultant water is partly mixed or polluted with hydrocarbons (referred to hereinafter as "dirt hydrocarbons"). Consequently, in the known methods, this $H_2O$ mixed with dirt hydrocarbons must be expensively cleaned or treated as special waste. However, in all of the methods and apparatuses 1 and 2 disclosed here, the $H_2O$ mixed with dirt hydrocarbons can be fed into the second C-converter 30 or into the combined hydrocarbon/C-converter 25/30 mentioned above via the $H_2O$-line 47. Optionally, a portion of the $H_2O$ is separated from the dirt hydrocarbons before being fed-in. For example, water that is slightly polluted with hydrocarbons (e.g. <1% dirt hydrocarbons) can emerge from the first CO-converter 7 and become heavily polluted with hydrocarbons (e.g. <10% dirt hydrocarbons) after separating out part of the $H_2O$. The temperature (preferably approx. 1000° C., see above) prevailing in the second C-converter 30 or in the combined hydrocarbon/C-converter 25/30 may be so high that the water will turn into steam and the dirt hydrocarbons be decomposed into carbon and hydrogen. The carbon that is produced in this manner from the dirt hydrocarbons is converted with $H_2O$ into CO and $H_2$. Overall, even when introducing polluted water into the second C-converter 30 or into the combined hydrocarbon/C-converter 25/30, only CO and $H_2$ are produced and are fed into the synthesis gas inlet 38 of the second CO-converter 37. The (product) water can be pre-heated by means of a heat exchanger (not shown) before it is introduced into the second C-converter 30 or into the above mentioned combined hydrocarbon/C-converter 25/30. This heat exchanger can be provided between the first C-converter 14 and the first CO-converter 7 for example or on one of the $H_2$ lines 21 or 24, or it can serve for the cooling of the outer wall of one of the hydrocarbon converters 9, 25 or the combined hydrocarbon/C-converter 25/30.

The operation of an apparatus 1 or 2 in accord with FIG. 3 occurs in exactly the same way as was described above for the various converters. The difference being that an $H_2$/C-aerosol or C-particles (if the optional filter 13 is present) is produced in a common hydrocarbon converter 9'. The $H_2$/C-aerosol or the C-particles are fed in as first and second sub-streams for the conversion process in the first C-converter 14 (i.e. the first sub-process) and in the second C-converter 30 (i.e. the second sub-process) and are converted in accordance with the reactions mentioned above. In this version too, an $H_2$-rich synthesis gas is first produced (apparatus 1) and, as an option, a synthetic hydrocarbon is then produced (apparatus 2).

As mentioned above, all the methods discussed above can be implemented with an $H_2$/C-aerosol or C-particles. An $H_2$/C-aerosol is firstly developed in the hydrocarbon converters 9, 25, 9' and from this aerosol, the C-particles can be filtered out by means of a filter 13. The operational sequence for one embodiment of the filter is described in the German patent application No. 10 2013 013 443 for example. The functioning thereof is also described therein for the case where the optional filter 13 forms an integral component of a C-converter.

The following examples provide a concrete example of the usage of the apparatus 2 for producing synthetic hydrocarbons from methane ($CH_4$). $CH_4$ (hydrocarbon-containing fluid) is decomposed carbon and hydrogen ($H_2$/C-aerosol) by means of a hydrocarbon converter 9', namely, thermally or by means of a plasma. Half of this $H_2$/C-aerosol is converted in the first sub-process in the first C-converter 14 with $CO_2$ into a synthesis gas containing comparatively little hydrogen (the ratio $CO:H_2$ is 1:1). The other half of the $H_2$/C-aerosol is converted in the second sub-process in the second C-converter 30 with water into a hydrogen-rich synthesis gas (the ratio $CO:H_2$ is 1:3). The hydrogen-rich synthesis gas is now converted with further water in the second CO-converter 37 in a water-gas-shift-reaction into $CO_2$ and hydrogen (the ratio $CO_2:H_2$ is 1:4). Subsequently, the four parts of hydrogen ($4H_2$) are separated from the one part of $CO_2$ and cleaned. The $CO_2$ from the second sub-process is fed into the first C-converter 14 of the first sub-process and thereby reused. In order to obtain the appropriate composition of the synthesis gas for the first CO-converter 7, half of the hydrogen ($2H_2$) from the second sub-process is added to the hydrogen-poor synthesis gas ($CO:H_2=1:1$) from the first sub-process (either in the mixer 20 or directly in the first CO-converter 7). The hydrogen-rich synthesis gas is then converted in the first CO-converter 7 into methanol or into a middle distillate and water in dependence on the conversion process occurring therein.

From the preceding general description and the described embodiments it is clear that the expression hydrogen-rich or $H_2$-rich synthesis gas being used here designates a synthesis gas which has a higher hydrogen content than the synthesis gas that is being produced in one of the C-converters. An $H_2$-rich synthesis gas has a ratio of hydrogen to carbon monoxide of more than 1.2 (i.e. a ratio $H_2/CO \geq 1.2$).

The invention has been described on the basis of preferred embodiments wherein the individual features of the embodiments described can be freely combined and/or exchanged with one another insofar as they are compatible. In like manner, individual features of the embodiments described can be omitted insofar as they are not absolutely necessary.

For the skilled person, numerous modifications and adaptations are possible and obvious without thereby departing from the inventive concept.

The invention claimed is:

1. A method for producing $H_2$-rich synthesis gas comprising the following steps:
   decomposing a hydrocarbon-containing fluid into an $H_2/C$-aerosol in a first hydrocarbon converter (9, 9') by supplying energy which is at least partly provided in the form of heat;
   introducing at least a first stream of the $H_2/C$-aerosol into a first sub-process which comprises the following steps:
   directing at least a part of the $H_2/C$-aerosol from the first hydrocarbon converter (9, 9') into a first C-converter (14);
   introducing $CO_2$ into the first C-converter (14) and mixing the $CO_2$ with the $H_2/C$-aerosol introduced into the first C-converter (14);
   converting the mixture of $H_2/C$-aerosol and $CO_2$ into a synthesis gas at a temperature of 800 to 1700° C.;
   mixing additional $H_2$ with the synthesis gas for producing $H_2$-rich synthesis gas;
   producing the additional hydrogen $H_2$ and the carbon dioxide $CO_2$ from a hydrocarbon-containing fluid in a second sub-process running in parallel with the first sub-process, wherein the $CO_2$ and a portion of the additional $H_2$ produced in the second sub-process are produced from CO and $H_2O$ by a water-gas-shift-reaction, and wherein the CO which is introduced into the water-gas-shift-reaction is produced in a second C-converter (30) from carbon C and water $H_2O$ at a temperature of 800 to 1700° C.; wherein the $CO_2$ produced in the second sub-process is introduced into the first C-converter (14); and
   wherein only a portion of the additional $H_2$ produced in the second sub-process is mixed with the synthesis gas from the first C-converter (14).

2. The method according to claim 1, wherein the carbon which is converted into CO in the second C-converter (30) is present in the form of C-particles of a $H_2/C$-aerosol.

3. The method according to claim 2, wherein the $H_2/C$-aerosol, whose carbon is converted into CO in the second C-converter (30), is a second stream of the $H_2/C$-aerosol produced in the first hydrocarbon converter (9, 9'); or
   wherein the $H_2/C$-aerosol, whose carbon is converted into CO in the second C-converter (30), is produced by decomposing a hydrocarbon-containing fluid in a second hydrocarbon converter (25) by supplying energy which is at least partly provided in the form of heat.

4. The method according to claim 3, wherein the process of supplying energy for the process of decomposing a hydrocarbon-containing fluid in at least one of the first and second hydrocarbon converters (9, 9', 25) is effected primarily by a plasma.

5. The method according to claim 4, wherein the $H_2/C$-aerosol, whose carbon is converted into CO in the second C-converter (30), is produced by decomposing a hydrocarbon-containing fluid in a second hydrocarbon converter (25) by supplying energy which is at least partly provided in the form of heat; and wherein the process of decomposing the hydrocarbon-containing fluid in the second sub-process at a temperature below 1000° C., in particular below 600° C., is effected by means of a microwave plasma.

6. The method according to claim 1, wherein the ratio of CO to $H_2$ in the $H_2$-rich synthesis gas is set to a value of greater than 1:1 to 1:3.

7. The method according to claim 1, wherein the ratio of CO to $H_2$ in the $H_2$-rich synthesis gas is set to a value of approximately 1:2.1.

8. A method for producing synthetic hydrocarbons in which an $H_2$-rich synthesis gas is produced by a method in accordance with claim 1, and wherein the $H_2$-rich synthesis gas is brought into contact with a catalyst and the temperature of the catalyst and/or that of the synthesis gas is controlled or regulated within a pre-determined temperature range in order to produce synthetic functionalised and/or non-functionalised hydrocarbons.

9. The method for producing synthetic hydrocarbons according to claim 8, wherein water results as a by-product during the production of the synthetic hydrocarbons and the water is mixed with a portion of the synthetic hydrocarbons, and
   wherein at least a portion of the water mixed with the portion of the hydrocarbons is introduced into the second C-converter (30).

10. An apparatus (1) for producing $H_2$-rich synthesis gas which comprises at least one first hydrocarbon converter (9, 9') for decomposing a hydrocarbon-containing fluid into an $H_2/C$-aerosol which comprises at least one process chamber having at least one hydrocarbon inlet (11) for a hydrocarbon-containing fluid and at least one first aerosol outlet (12) for a $H_2/C$-aerosol and at least one unit for bringing energy into the process chamber, wherein the energy consists at least partly of heat;
   wherein the apparatus (1) further comprises a first group of converters (3) for the implementation of a first sub-process and a second group of converters (5) for the implementation of a second sub-process,
   wherein the first group of converters (3) comprises the following:
   a first C-converter (14) for the conversion of C and $CO_2$ into CO, wherein the first C-converter (14) comprises at least one further process chamber having at least one $CO_2$ inlet (16) for $CO_2$, at least one aerosol inlet (15) for an $H_2/C$-aerosol and at least one outlet (17), wherein the aerosol inlet (15) of the first C-converter (14) is connected directly to the at least one aerosol outlet (12) of the first hydrocarbon converter (9, 9');
   a first mixer (20) which comprises a synthesis gas inlet that is connected to the outlet (17) of the first C-converter (14) and an $H_2$ inlet for additional $H_2$ and the mixer being adapted for mixing incoming synthesis gas and additional $H_2$ to form an $H_2$-rich synthesis gas;
   wherein the second group of converters (5) comprises a second CO-converter (37) which is suitable for implementing a water-gas-shift-reaction in which CO and $H_2O$ are converted into $CO_2$ and $H_2$, and wherein the second CO-converter (37) has at least one $CO_2$ outlet (41) for $CO_2$ and an $H_2$ outlet (40) for $H_2$ and at least one inlet (38) for at least synthesis gas, wherein the outlet (41) for $CO_2$ is connected to the $CO_2$ inlet (16) of the first C-converter (14); wherein the $H_2$ outlet (40) is connected to the $H_2$ inlet of the mixer (20); wherein a $H_2$ line (24) is connected at a point between the second CO-converter (37) and the mixer (20) for feeding off $H_2$; and wherein the second group of converters (5) comprises a second C-converter (30) for the conversion of C and $H_2O$ into CO and $H_2$, wherein the second C-converter (30) comprises at least one process chamber having at least one $H_2O$-inlet (32) for $H_2O$, at least one aerosol inlet (31) for $H_2/C$-aerosol and at least one outlet (33) for synthesis gas, and wherein the outlet (33) for synthesis gas of the second C-converter (30) is connected to the inlet (38) for at least synthesis gas of the second CO-converter (37).

11. The apparatus (1) according to claim 10, wherein the inlet (38) for at least synthesis gas is provided for the purposes of introducing the $H_2O$ and the synthesis gas together into the second CO-converter (30); or wherein the second CO-converter (30) comprises a separate $H_2O$-inlet (32) for introducing the $H_2O$ separately from the synthesis gas.

12. The apparatus (1) according to claim 10, wherein the first hydrocarbon converter (9') comprises at least one second aerosol outlet (28) for $H_2$/C-aerosol, which is connected to the at least one aerosol inlet (31) of the second C-converter (30).

13. The apparatus (1) according to claim 10, wherein the second group of converters (5) comprises a second hydrocarbon converter (25) for decomposing a hydrocarbon-containing fluid into an $H_2$/C-aerosol which comprises at least one process chamber having at least one inlet (27) for a hydrocarbon-containing fluid and at least one aerosol outlet (28) for $H_2$/C-aerosol and at least one unit for introducing energy which consists at least partly of heat into the process chamber; and wherein the aerosol outlet (28) of the second hydrocarbon converter (25) is connected to the at least one aerosol inlet (31) of the second C-converter (30).

14. The apparatus (1) according to claim 13, wherein the first hydrocarbon converter (9) is a high temperature plasma converter; and wherein the second hydrocarbon converter (25) is a low-temperature plasma converter or a thermally operated hydrocarbon converter which uses the waste heat from the first hydrocarbon converter (9) for a heating process.

15. The apparatus (1) according to claim 10, wherein a filter (13) which is suitable for the separation of $H_2$ and C-particles is arranged at the inlet of the first C-converter (14) and/or the second C-converter (30), or wherein a filter (13) adapted for separating $H_2$ and C-particles is integrated into the first C-converter (14) and/or into the second C-converter (30).

16. An apparatus (2) for producing synthetic functionalised and/or non-functionalised hydrocarbons which comprises an apparatus according to claim 10; and a first CO-converter (7) which comprises a process chamber in which a catalyst is arranged and further comprises at least one inlet (22) for synthesis gas which is connected to the outlet (17) of the first C-converter (14) or to the mixer (20), wherein the synthesis gas is directed into contact with the catalyst, and a control unit to controlling or regulating the temperature of the catalyst and/or that of the synthesis gas at a pre-determined temperature.

17. The apparatus (2) for producing synthetic hydrocarbons according to claim 16, wherein the first CO-converter (7) is suitable for the implementation of a method for the production of synthetic functionalised and/or non-functionalised hydrocarbons in which water that is mixed with a portion of the hydrocarbons is produced as a by-product; and wherein the apparatus (2) comprises a $H_2O$-line (47) which is configured to introduce at least a portion of the water from the first hydrocarbon converter (7) mixed with the portion of the hydrocarbons into the second C-converter (30).

* * * * *